United States Patent [19]
Stacklies et al.

[11] Patent Number: 5,803,609
[45] Date of Patent: Sep. 8, 1998

[54] PROCESS FOR PROVIDING A BEARING OF A TILTING DEVICE AND TILTING DEVICE

[75] Inventors: Horst Stacklies, Aalen; Steffen Pommerening, Heilbronn; Bruno Schweizer, Oberkochen; Jurgen Schweizer, Westerhofen, all of Germany

[73] Assignee: Carl-Zeiss-Stiftung, Germany

[21] Appl. No.: 934,291

[22] Filed: Sep. 19, 1997

[30] Foreign Application Priority Data

Sep. 19, 1996 [DE] Germany .................. 196 38 213.0
Jan. 17, 1997 [DE] Germany .................. 197 01 485.2

[51] Int. Cl.⁶ ........................................ F16C 32/00
[52] U.S. Cl. ........................................ 384/2; 384/446
[58] Field of Search ................ 384/2, 3, 4, 5, 384/6, 446

[56] References Cited

U.S. PATENT DOCUMENTS 3,245,707  4/1966  Cook et al. ...................... 384/2
4,383,763  5/1983  Hutchings et al. .
4,660,941  4/1987  Hattori et al. .
4,691,212  9/1987  Solcz et al. .
4,708,420  11/1987  Liddiard .
5,170,277  12/1992  Bard et al. .

FOREIGN PATENT DOCUMENTS 195 19 161
A1  11/1995  Germany .

Primary Examiner—Lenard A. Footland

[57] ABSTRACT

The invention relates to a process for providing a bearing of a tilting device, which makes possible a tilt around at least one axis, with a tilting member, a base member, and a bearing situated between these two members. The center of gravity of the tilting member is situated at the pivot point of the bearing. A first portion of the tilting member is arranged above the pivot point, a second portion of the tilting member is arranged below the pivot point, and the weight of the first portion of the tilting member and the weight of the second portion of the tilting member correspond to each other.

10 Claims, 2 Drawing Sheets

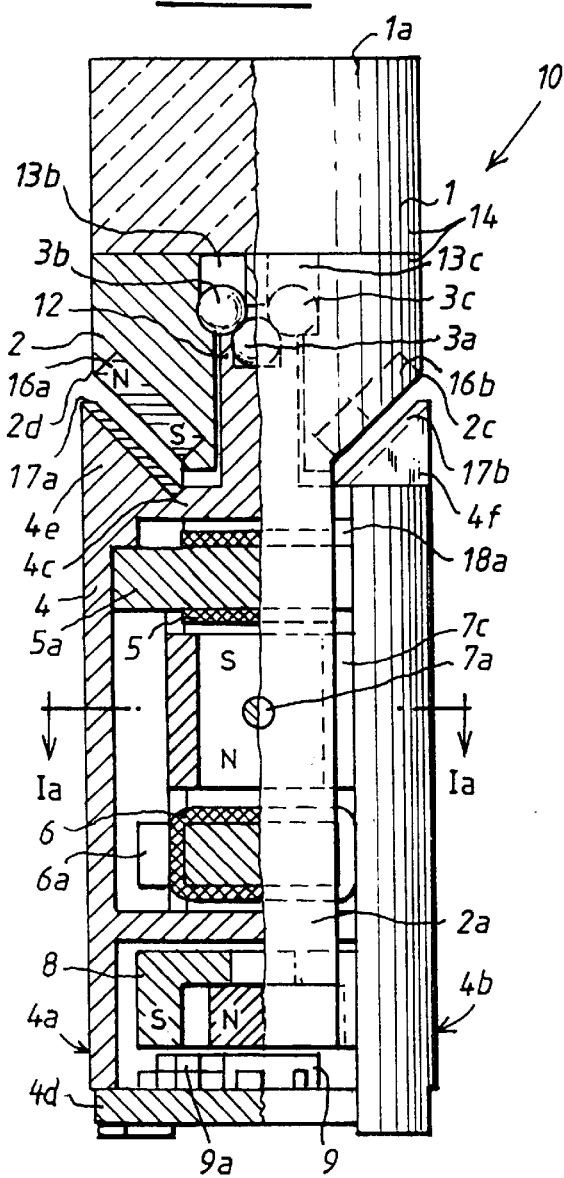
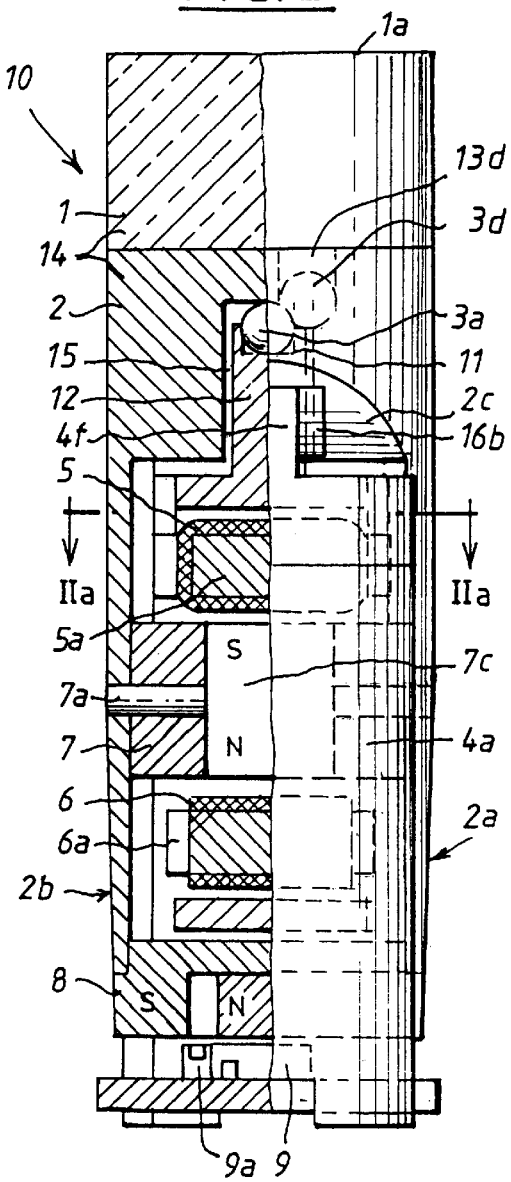
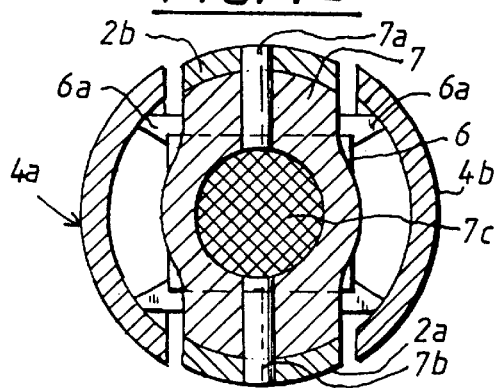
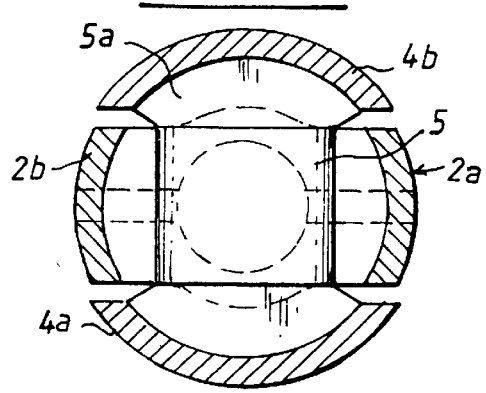

PROCESS FOR PROVIDING A BEARING OF A TILTING DEVICE AND TILTING DEVICE

BACKGROUND OF THE INVENTION

1. Field of the Invention

This invention relates to a process for providing a bearing of a tilting device, and more particularly to a bearing that makes it possible to tilt about at least one axis, and a tilting device which operates according to this process.

2. Description of Relevant Art

Such tilting devices are well known in the art. They serve for deflecting through a given angle, and in a defined manner, a light beam falling on the tilting devices. In particularly, 1-axis and 2-axis tilting mirrors are differentiated.

Single-axis tilting mirrors are today a commercially well known product with great technical variation. Two-axis tilting mirrors are likewise state of the art and obtainable on the market, but are still subject to important technical limitations. These limitations are, in particular:

Limited tilt angle about the x-axis or y-axis, normally through an angle smaller than 1°;

Limited constructional size (in which given tilt angles require a given minimum constructional size or else a maximum constructional size, which is respectively troublesome);

Constructional size of the tilting mirror arrangement, which is appreciably larger than the mirror surface, particularly behind the mirror surface of small mirrors (i.e., high packing densities cannot be attained with the mirrors according to the known state of the art);

A complicated production technique.

A tilting mirror arrangement used for scanning is known from U.S. Pat. No. 4,708,420. In it, the scanning mirror is connected via flexible joints to piezoceramic drive elements that are arranged parallel to the mirror surface. This arrangement has to be very large so that the piezoceramic drive elements can tilt the mirror through a large angle. This results from the small deflection of the piezoceramic drive elements, which is proportional to the length of these elements. This arrangement is thus not suited to tilt small mirrors through a large angular range, when the drive mechanism behind the tilting mirror is to be limited to the dimensions of the mirror surface.

In a tilting mirror arrangement known from U.S. Pat. No. 4,383,763, the mirror is mounted on a tilting point and is moved by piezoelectric ceramics. Here also, the dimensions of the mirror have to be very large if the tilting mirror is to be tilted through at least 1°.

A tilting mirror mounting is known from U.S. Pat. No. 4,660,941, in which the movement of the tilting mirror is effected by piezoelectric elements, and the piezoelectric elements act on the mirror via levers. This arrangement is also not suitable for tilting a small mirror through at least 1°.

A piezoelectric beam reflector is known from U.S. Pat. No. 5,170,277, in which the mirror member is directly attached to the piezoelectric element. This has the disadvantage that the mirror has no defined pivot point when pivoting.

A piezoelectric beam reflector is known from U.S. Pat. No 4,691,212, and is used in a scanning arrangement. The disadvantage of this arrangement is that a given deflection angle cannot be rigidly maintained when the pivot point is to remain stationary.

A piezoelectric scanning device is known from German Patent DE 195 19 161, in which a pair of piezoelectric plate elements, which extend transversely of a base, act in common on a constructional element at one end such that this constructional element tilts. Thus, for one tilt axis, two plate elements that move together are necessary, and have to move oppositely for tilting. The plate elements engage for this purpose at different places on a bar beneath the constructional element. Two additional plate elements are required for tilting around a tilt axis perpendicular to this.

SUMMARY OF THE INVENTION

The objects of the invention are to provide a process for a tilting device in which a deflection which has been set is inherently retained, without an energy supply, and such a tilting device.

This object is achieved by a process for providing a bearing of a tilting device that makes it possible to tilt the tilting device around at least one axis by providing a tilting member, a base member, and a bearing with a pivot point situated between the tilting member and the base member, and locating the center of gravity of the tilting member at the pivot point of the bearing.

The process according to the invention for providing a bearing of a tilting device makes possible a tilt around at least one axis. The process provides a tilting member, a base member, and a bearing located between these two members. The center of gravity of the tilting member is then located at the pivot point of the bearing. This has the great advantage that energy has to be supplied only for a change of position. The tilting position which is set then remains without further expenditure of energy.

In order to have no oscillations in the system and in order to obtain a tilting device which is easy to manufacture, it is advantageous if only the tilting member, including the parts attached to it, is moved during a tilting movement.

The tilting device according to the invention that results from the above requirement, and which makes possible a tilting about at least one axis, has a tilting member, a base member, and a bearing located between these two members. The tilting device has a first portion of the tilting member arranged above the pivot point. A second portion of the tilting member is located below the pivot point. The weight of the first portion of the tilting member and the weight of the second portion of the tilting member correspond to each other. The center of gravity of the tilting member thereby lies exactly at the pivot point of the bearing.

It is advantageous if four round bearing members are used for providing a bearing. Three of the bearing members can then be arranged symmetrically about an axis in one plane beneath the tilting member, and a ball can be arranged centrally on the base member. If the one ball is mounted on the three other bearing members, a stable, secure bearing is obtained. The central bearing member must be a ball, while the three other bearing members can be balls or round cylinders.

The base member is advantageously magnetically prestressed together with the tilting member, so that in an inclined position the two members do not become separated due to the effect of gravity.

It is advantageous if a drive device is built into the tilting device. This is particularly the case if controlled motions (e.g., for the deflection of a light beam, a motion of a laser attached to the tilting device, etc.) of the tilting device are expected. The drive device for one axis is then constructed, in an advantageous fashion, from a coil on the base member and a magnet on the tilting member. It is then advantageous if the magnet is a permanent magnet.

For the precise determination of the amount of tilting, it is advantageous if a position measuring system is contained in the tilting device itself. This position measuring system can be constructed in an advantageous fashion from at least one Hall sensor and at least one permanent magnet. It is then advantageous if the permanent magnet is attached to the tilting member.

The tilting device according to the invention is suitable for all uses in which a single-axis motion is concerned, over a relatively small tilt angle which is however greater than 1° (<10°, advantageously <5°), at relatively high tilt frequencies. The uses include scanning, exposure, material erosion, and the like.

In particular, large segment arrays can be constructed with the tilting device according to the invention, and can consist of a surface arrangement of many of the tilting devices according to the invention, since the drive mechanism is arranged completely beneath the surface which is to tilt.

Both passive components (e.g., mirror surfaces and the like) and also active components (e.g., laser diodes) can then be arranged on the surface which is to tilt.

BRIEF DESCRIPTION OF THE DRAWINGS

The invention will now be described with reference to the accompanying drawings, in which:

FIG. 1 shows the tilting device according to the invention in a side, partially sectional, view;

FIG. 1a shows a section in the plane Ia given in FIG. 1;

FIG. 2 shows the tilting device of FIG. 1 according to the invention in a further side, partially sectional, view, which is at right angles to the side, partially sectional, view of FIG. 1;

FIG. 2a shows a section in the plane IIa given in FIG. 2;

FIG. 3b shows a top view of the sensor system of FIG. 3a.

DETAILED DESCRIPTION OF PREFERRED EMBODIMENTS

Figure 3A:
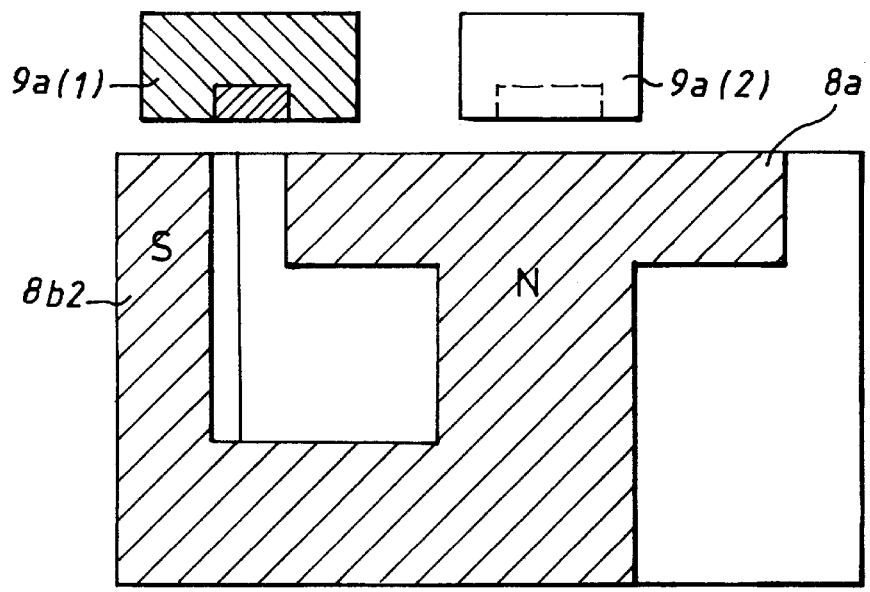
FIG. 3a shows the sensor system in a side view.

The tilting device (10) shown in FIGS. 1 and 2 is embodied as a tilting mirror with a sensor system (9a). The tilting device (10) shown consists of an upper tilting member (14) which can be placed at an inclination, by an amount which is established constructionally beforehand, relative to a lower base member (4). A bearing (3a, 3b, 3c, 3d) is located between the two members (4, 14).

The provision of a bearing (3a, 3b, 3c, 3d) between the upper tilting member (14) and the lower base member (4) takes place by means of four bearing balls (3a, 3b, 3c, 3d), wherein one bearing ball (3a) is fixedly connected to a seating (11) provided for this purpose on a cylindrical extension (12) in the upper portion of the base member (4), and the three other bearing balls (3b, 3c3d) can move slidingly on it. The cylindrical extension (12) in the upper portion of the base member (4) projects far ;into the large opening (15) in the lower portion (12) of the tilting member (14).

Corresponding seatings (13b, 13c, 13d) for the three upper bearing balls (3b, 3c, 3d) are installed in the lower portion (2) of the tilting member (14), ion the large opening (15) which is provided for this purpose and in which the three upper bearing balls (3b, 3c, 3d) are secured.

Thus the same, fixed pivot point for all the axes is provided in the midpoint of the lower bearing ball (3a), by means of the precise spherical shape and the three seating points of the upper bearing balls (3b, 3c, 3d) on the lower bearing ball (3a).

So that the tilting device (10) can be used in any optional spatial position (by which is meant the spatial position or orientation of the base member (4)), the center of gravity of the tilting member (14) and the parts which are rigidly connected to it is situated at the pivot point. If the center of gravity is situated at the pivot point, this has the decisive advantage that the mutual spatial relationship between the tilting member (14) and the base member (4), once set, remains unchanged without further expenditure of energy. Thus an expenditure of energy is only required when the relative spatial position between the tilting member (14) and the base member (4) is to be altered. When this position of the tilting member (14) relative to the base member (4) has been reached, however, no further expenditure of energy is needed in order to keep the tilting member (14) in this position relative to the base member (4).

This advantage of the provision of a bearing according to the invention greatly reduces the energy consumption of the tilting device (10), and insures that no heat jamming occurs due to waste heat. This is a great problem in many of the tilting mirrors offered on the market, particularly when striving for a small constructional size.

The movable tilting member (14) has the shape of a slotted tubular sleeve (see FIGS. 1 and 2), as well as the solid parts (4a and 4b) of the base member (4). The tilting member (14) has in its upper portion a mirror member (1), which as a mirrored surface (1a), and which is fixedly connected (e.g., adhered) to the mounting member (2) installed under the mirror member (1).

Two laterally relatively thin apron members (2a, 2b) extend downward on this mounting ember (2), and serve as attachment members for a first magnet holder (7) of titanium, which is fixedly installed on them. A permanent magnet (7c) is held in this magnet holder (7) so that its magnetic poles (north and south pole) face toward the two coils (5, 6). Due to the tubular sleeve shape of the tilting member (14) in its lower portion, it is possible to bring up the first permanent magnet (7c), which is a part of the two-axis drive system, between the two stationary coils (5, 6) on the base member (4). In order to fix the magnet holder (7) with the permanent magnet (7c) of the drive system to the apron members (2a, 2b), a pin (7a, 7b) is installed in a respective opening of the apron members (2a, 2b) and of the magnet holder (7) on the respective two sides, and this pin (7a, 7b) is adhesively fixed in the two openings. Any other kind of secure fastening could of course also be used at this location.

A second permanent magnet (8) is installed at the end of the apron members (2a, 2b) (see also FIGS. 3a and 3b), the installation being effected by adhering the two members (2a, 2b) and the permanent magnet (8) together. Here also, the sleeve shape of the tilting member (14) in its lower region facilitates firmly installing (e.g. by means of adhesive) the second permanent magnet (8), which represents a portion of the sensor system (see FIGS. 3a and 3b), on the movable tilting member (14).

In the embodiment shown in FIGS. 1 and 2, the magnetic north pole of the magnetic lies downward, and the apron members (2a, 2b) of the tilting member (14) are arranged in this north-south extension direction. In FIG. 1a, the exact shape of the upper permanent magnet (7c) is again clearly shown. The permanent magnet (7c) is held by a magnet holder (7), which ha a substantially cylindrical tubular shape with different wall thicknesses with a circular middle opening to receive the permanent magnet (7c).

The mounting member (2) has two oblique surfaces (2c, 2d) which are inclined obliquely upward and which are respectively located on the opposite sides of the mounting member (2). There is a respective recess in these oblique surfaces (2c, 2d), in which a respective permanent magnet (16a, 16b) in inset. These two permanent magnets (16a, 16b) cooperate with two exactly opposite, obliquely arranged soft magnetic plates (17a, 17b) in the upper portion of the base member (4), such that the tilting member (14) and the base member (4) are magnetically prestressed together and the four bearing balls (3a, 3b, 3c, 3d) are pressed against each other. It is thereby insured that the movable tilting member (14) seats with its three bearing balls (3b, 3c, 3d) on the bearing ball (3a) of the base member (4). Furthermore, an additional protection of the tilting device (10) is present against twisting around the z-axis (two rotational degrees of freedom).

The base member (4) is essentially a hollow cylindrical body which has recesses (18a), (18b not shown in the Figure) to receive the apron members (2a, 2b) of the tilting member (14). At the upper end, the base ember (4) has an upper closure cap (4c), from which the cylindrical extension (12) with its seating (11) for the bearing ball (3a) projects out in the middle axis. In the upper region of the upper closure cap (4c), laterally of this extension (12), two mutually opposite shoulders (4e, 4f) run obliquely upward, whose inclination runs parallel to the inclination of the corresponding opposing oblique face (2c, 2d) on the tilting member (14) in the undeflected state of the tilting device (10).

In many cases, according to the required use of the tilting mirror, the two permanent magnets (16a, 16b) which cooperate with the two obliquely arranged plates (17a, 17b) in the upper portion of the base member (4), and which magnetically prestress the tilting member (14) against the base member (4) (so that the four bearing balls (3a, 3b, 3c, 3d) are pressed against each other), are not sufficient. This concerns in particular the stability of the mounting, since this can be too weak, and can permit a twisting, even though small, of the tilting member (14) around the z-axis.

This can easily be remedied if the two permanent magnets (16a, 16b) are replaced by at least three, advantageously four, permanent magnets (there can however also be more magnets), which are advantageously arranged at the same spacing from each other. In each case, the permanent magnets must then be arranged so that they do not all lie on one line, but span a surface (here the magnets must not be arranged in a square, but only in a triangle, rectangle, or polygon, where the mutual spacings of the magnets must not be equal).

While two permanent magnets (16a, 16b), as shown in the embodiment, can provide stability around only one axis (they are to be narrow for this purpose), a good stabilization around two axes is first possible with at least three magnets. With an increasing number of magnets, the stability against twisting around the z-axis progressively improves.

The oblique faces (17a, 17b) on the base member (4) consist of a magnetic material (e.g., soft iron) and, together with the permanent magnets (16a, 16b), provide for a magnetic prestressing between the base member (4) and the tilting member (14). Both magnetic poles of the permanent magnets (16a, 16b) are located opposite the oblique faces (17a, 17b), so that a large magnetic retention force results due to the magnetic closure which is thereby obtained.

A retaining bar (5a) (preferably of a magnetizable material such as soft iron) is located beneath the closure cap (4c) of the base member (4), and the turns of a first coil (5) are wound around it. This first coil (5) is located in the tilting device (10) above the first permanent magnet (7c) attached to the tilting member (14) and, together with this permanent magnet (7c), serves as a driving device for a single-axis relative displacement between the base member (4) and the tilting member (14). Its windings are oriented perpendicular to the north-south axis of the magnet (7c).

A further retaining bar (6a) (preferably of a magnetizable material such as soft iron) is located beneath the permanent magnet (7c) on the tilting member (14), and the turns of a second coil (6) are wound around it, perpendicular to the first. This coil (6) serves, together with the permanent magnet (7c), as a driving device for a second single-axis relative displacement between the base member (4) and the tilting member (14). Its windings are also oriented perpendicular to the north-south axis of the magnet (7c), but in addition are oriented perpendicular to the windings of the first coil (5). It can also be said that both coils (5, 6) are oriented (as regard their winding direction) transversely to each other.

Since the windings of the first coil (5) are perpendicular to the windings of the second coil (6), when a current flows through the first coil (5) there results, e.g., a rotation around the x-axis, while a current flow in the second coil (6) effects a rotation around the y-axis which is perpendicular to the x-axis. A simultaneous current flow through both coils (5, 6) thus effects a motion of the tilting member (14) simultaneously around the x-axis and the y-axis.

Figure 3B:
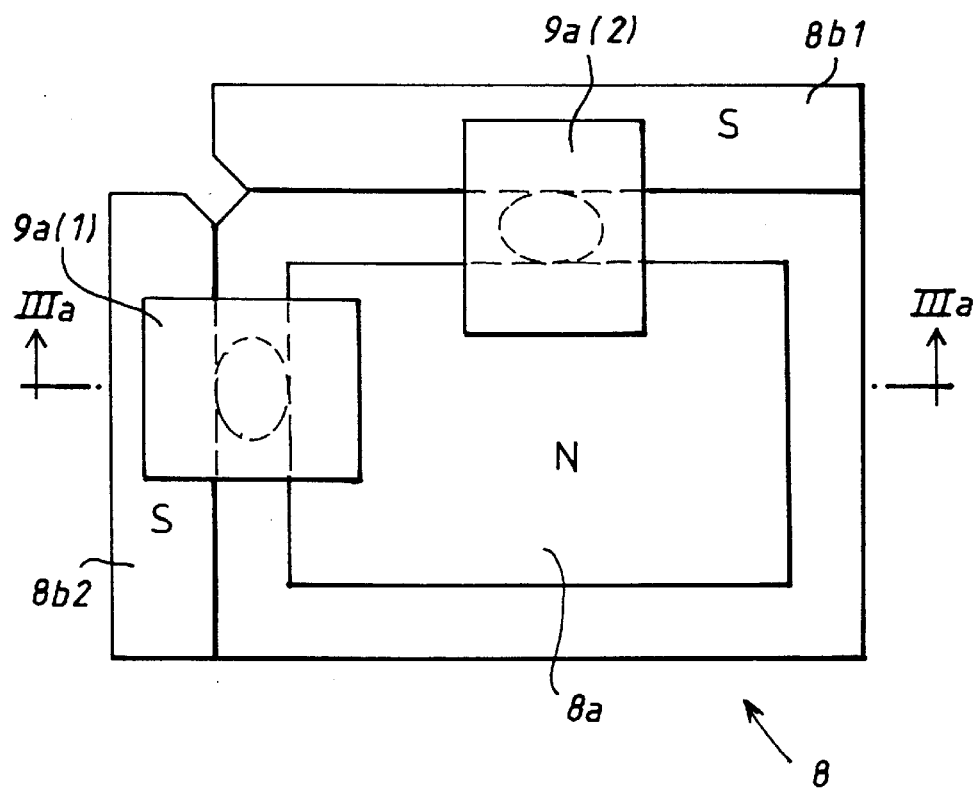

A lower closure cap (4d) is located on the apron members (2a, 2b) beneath the second permanent magnet (8) in the lower portion of the base member (4), and a board (9) with electrical components (9a) which belong to a sensor system is installed on it (see also FIGS. 3a and 3b).

If current is supplied to one or both coils (5, 6), a force (which is perpendicular to the magnetic field and to the direction of the current) acts on the electrical conductor in the magnetic field of the permanent magnet (7c). Since the coils (5, 6) are fixedly connected to the base member (4), this force now deflects the permanent magnet (7c). All the other parts connected to it thereby move in a surface which passes spherically around the rotation point, i.e., the tilting member (14) also. By means of this movement, the mirrored surface (1a) on the mirror member (1) is tilted through the respective desired angle around the x-axis or the y-axis, or around both axes simultaneously.

Since all the above-described parts are fixedly connected to the tilting member (14), the tilting device according to the invention has only one moving part (14), which is rigid per se, and which can move relative to the other rigid part (4). All the parts of the bearing system, the drive system and the position measuring system are rigidly connected to these two parts and execute no motions on their own.

It goes without saying that all the dimensioning for individual components of the tilting device (10) must be such that a free movement of the tilting member (14) relative to the base (4) is established, and that none of the components of the tilting member (14) strikes against components of the base member (4). Furthermore, care has to be taken in the dimensioning of the drive systems (coils (5, 6) and permanent magnet (7c)) such that they can produce the forces required for the displacement. In the choice of the components for the position measuring system, care has to be taken that the selected position measuring sensors have the required measurement accuracy and resolution.

The sensor system effects precise position determination of the tilting device (10). In the embodiment shown, several Hall sensors (9a) (at least one sensor (9a) for each tilt axis) are installed on the board (9) and emit a different voltage, according to the tilt angle of the tilting member (14). The Hall sensors (9a) thus evaluate the direction of the magnetic field of the permanent magnet (9). The shape of the permanent magnet (9) of the sensor system can in particular be seen from FIGS. 3a and 3b. The permanent magnet (8) is constructed such that it has a relatively large, square north pole (8a) of a suitable material. Its size is such that, at the maximum permissible deflection of the tilting member (14), the Hall sensor (9a(1), 9a(2)) never reaches the middle of the magnetic north pole member (8a). The magnetic south pole is placed so high and to the side, such that a respective gap arises between the surface of the magnetic north pole portion (8a) and of the magnetic south pole portion (8b(1), 8b(2)). The two Hall sensors (9a(1), 9a(2)) thereby have a maximum sensitivity for tilting motions of the tilting member (14) on which the permanent magnet (8) is installed.

The sensor system has a signal lead to a computer system or to a control system for the coil current of the two coils (5, 6), so that when the position of the tilting member (14) deviates relative to a desired position, the driving of the coils (5, 6) is continued until the tilting member (10) has assumed the desired position.

The two coils (5, 6), and also the board (9) with the Hall sensors (9a) in placer, are rigidly attached (e.g., adhered) to the stationary portions (4a, 4b) of the base member (4), before the outer portions (4a, 4b) of the base member (4) are rigidly attached to the latter (e.g., adhesion during assembly).

The invention relates to a tilting device that satisfies several desirable requirements. These requirements can be listed as follows:

The possible tilt angle in one axis, or in two mutually perpendicular axes, amounts to ±3° and more, however at least 1.5°.

The cross section of the tilting device (10) is not greater than the mirror surface (1a), so that several individual mirrors can be positioned adjacently, in order to be able, for example, to build a spatially curved segmented mirror form many of the above-described tilting devices (10). This is always possible here at small tilt angles, <10°.

The price is well below that of the commercially available tilting devices (>1,000.-DM ($550)), since a small number of components which are easily produced are handled by rapid assembly techniques.

The tilting device (10) is adjustable, which is insured by the sensors (9a) for establishing location.

Operation is assured in any spatial position; this is guaranteed by the coincidence of the pivot point and the center of gravity of the tilting member (14).

Small energy consumption, so that the power when several tilting devices are combined into an array is not too high. Here also, the coincidence of the pivot point and the center of gravity is advantageous.

The design of the tilting device (10) is as free as possible from oscillation, so that control circuits cannot oscillate unstably.

Design of the tilting device is as simple as possible, so that mass production is possible.

The preferred field of sue of the tilting device is as a tilting mirror. This can be single-axis or two-axis. Although single-axis and two-axis tilting mirrors are obtainable commercially at the present time, they have the disadvantage, however, that they cannot fulfill one or more of the above-named requirements.

The tilting device according to the invention can in particular be used as a small two-axis tilting mirror, the constructional size of which in the mirror plane is not larger than the mirror itself, the mirror surface (1a) typically being a circle of 3–12 mm diameter. Here a tilting movement of at least ±1.5° to 3° in two mutually perpendicular axes is attained, an angular resolution within about half of the possible tilting region of 2,048 individual steps (±0.8° at a tilting angle of ±1.5°). In order to be able to control the tilting device, a fixedly built-in sensor system (9) is present, and determines the actual position of the tilting member (14) relative to the base member (4). The tilting device (10) is built as a module, in order to be able to combine several modules into a segmented, large mirror. Furthermore, the tilting device (14) is suitable for inexpensive mass production.

We claim:

1. A tilting device that is tiltable around at least one axis, comprising:
    a tilting member (14),
    a base member (4), and
    a bearing (3a, 3b, 3c, 3d) with a pivot point situated between said tilting member (14) and said base member (4), wherein:
        a first portion (1) of said tilting member (14) is arranged above said pivot point,
        a second portion (2) of said tilting member (14) is arranged below said pivot point, and
        the weight of said first portion (1) and the weight of said second position (2) correspond to each other.

2. The tilting device according to claim 1, further comprising a position measuring system (8, 9) included in said tilting device.

3. The tilting device according to claim 2, wherein said position measuring system comprises at least one Hall sensor (9) and at least one permanent magnet (8).

4. The tilting device according to claim 3, wherein said at least one permanent magnet (8) is attached to said tilting member (14).

5. The tilting device according to claim 1, wherein said bearing (3a, 3b, 3c, 3d) comprises:
    a ball (3a) arranged centrally on said tilting member (14), and
    three balls (3b, 3c, 3d) arranged in one plane on said base ember (4) and providing a bearing surface for said ball (3a) on said tilting member (14).

6. The tilting device according to claim 1, further comprising a magnetic device for magnetically prestressing together said base member (4) and said tilting member (14).

7. The tilting device according to claim 1, further comprising a drive device (5, 7c) included in said tilting device.

8. The tilting device according to claim 7, wherein said drive device for one tilt axis comprises a coil (5) on said base member (4) and a magnet (7c) on said tilting member (14).

9. The tilting device according to claim 8, wherein said magnet (7c) comprises a permanent magnet.

10. The tilting device according to claim 3, wherein said bearing (3a, 3b, 3c, 3d) comprises:
    a ball (3a) arranged centrally on said base member (4), and
    three balls (3b, 3c, 3d) arranged in one plane on said tilting member (14) and providing a bearing surface for said ball (3a) on said base member (4).

* * * * *

UNITED STATES PATENT AND TRADEMARK OFFICE
CERTIFICATE OF CORRRECTION

PATENT NO. : 5,803,609
DATED : September 8, 1998
INVENTOR(S) : Stacklies, et al It is certified that error appears in the above-identified patent and that said Letters Patent is hereby corrected as shown below:

On the title page: Item ]56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 1 | 7 | 5 | 8 | 3 | 2 | 11/27/1979 | Umeki et al. | | | |
| | | 4 | 0 | 2 | 1 | 0 | 9 | 6 | 05/03/1977 | Dragt | | | |
| | | 3 | 9 | 4 | 6 | 1 | 6 | 6 | 03/26/1976 | Wossidlo | | | |
| | | | | | | | | | | | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | | DE | 19 | 50 | 45 | 6 | 8 | A1 | 08/14/1989 | Germany | | | | |
| | | | | | | | | | | | | | | |

Signed and Sealed this

Twenty-seventh Day of April, 1999

*Attest:*

Q. TODD DICKINSON

*Attesting Officer*      *Acting Commissioner of Patents and Trademarks*